(12) United States Patent
Childers

(10) Patent No.: US 7,044,606 B2
(45) Date of Patent: May 16, 2006

(54) PROJECTION OF PIXELIZED COLOR IMAGES

(75) Inventor: Winthrop D. Childers, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 82 days.

(21) Appl. No.: 10/812,751

(22) Filed: Mar. 29, 2004

(65) Prior Publication Data

US 2005/0213053 A1    Sep. 29, 2005

(51) Int. Cl.
G03B 21/00 (2006.01)
G03B 21/26 (2006.01)
G03B 21/14 (2006.01)
G03B 21/28 (2006.01)
G02F 1/001 (2006.01)
G02F 1/135 (2006.01)

(52) U.S. Cl. .................. 353/31; 353/34; 353/94; 353/82; 353/98; 348/771; 349/30

(58) Field of Classification Search .......... 353/31, 353/34, 102, 94, 82, 98–99; 348/771; 349/30, 349/25
See application file for complete search history.

(56) References Cited

U.S. PATENT DOCUMENTS

| 5,835,255 | A | 11/1998 | Miles |
| 5,986,796 | A | 11/1999 | Miles |
| 6,567,134 | B1 * | 5/2003 | Morgan ............ 348/743 |
| 6,582,080 | B1 * | 6/2003 | Gibbon et al. ........ 353/20 |
| 6,585,378 | B1 | 7/2003 | Kurtz |
| 6,729,734 | B1 * | 5/2004 | Childers et al. ...... 353/122 |
| 6,817,717 | B1 * | 11/2004 | Childers et al. ....... 353/31 |

* cited by examiner

Primary Examiner—W. B. Perkey
Assistant Examiner—Magda Cruz

(57) ABSTRACT

A projection system projects a pixelized color images onto a display surface. The projection system includes a light source, an interferometric modulator, and a reflective light modulator. The interferometric modulator is configured to modulate the wavelength of light and reflect modulated light toward the display surface. The reflective light modulator is disposed to receive light from the light source and selectively reflect the light toward the interferometric modulator and the display surface.

26 Claims, 6 Drawing Sheets

PROJECTION OF PIXELIZED COLOR IMAGES

FIELD OF THE INVENTION

This invention relates in general to video technology and, more particularly, to a display device having an interferometric modulator and a reflective light modulator.

BACKGROUND OF THE INVENTION

Various types of digital projectors are known in the art. One common type uses a combination of dichroic optics, three light modulator chips, and combining optics. The dichroic optics separate the light into primary color beams so that each beam may be modulated by one of the three light modulator chips. After modulation, the light beams are recombined before being displayed on a display surface. Providing three light modulator chips increases the size and cost of this type of projector.

As an alternative, the use of LCD chips or panels can be somewhat cost effective. However, LCD panels require polarizing the light. Polarizing the light reduces output intensity while adding the cost of polarizing.

Another type of projector utilizes a combination of sequential color generation, such as a white light source passing through a rotating color filter wheel, and a micromirror array. A significant portion of the potential color saturation is lost and visual artifacts such as color separation result from using sequential color. Designs such as scrolling color wheels can partially mitigate these issues but add complexity and difficult timing and assembly issues to the system.

SUMMARY OF THE INVENTION

According to principles of the present invention, in one embodiment, a projection system projects a pixelized color images onto a display surface. The projection system includes a light source, an interferometric modulator, and a reflective light modulator. The interferometric modulator is configured to modulate the wavelength of light and reflect modulated light toward the display surface. The reflective light modulator is disposed to receive light from the light source and selectively reflect the light between the interferometric modulator and the display surface.

DETAILED DESCRIPTION OF THE INVENTION

Figure 1:
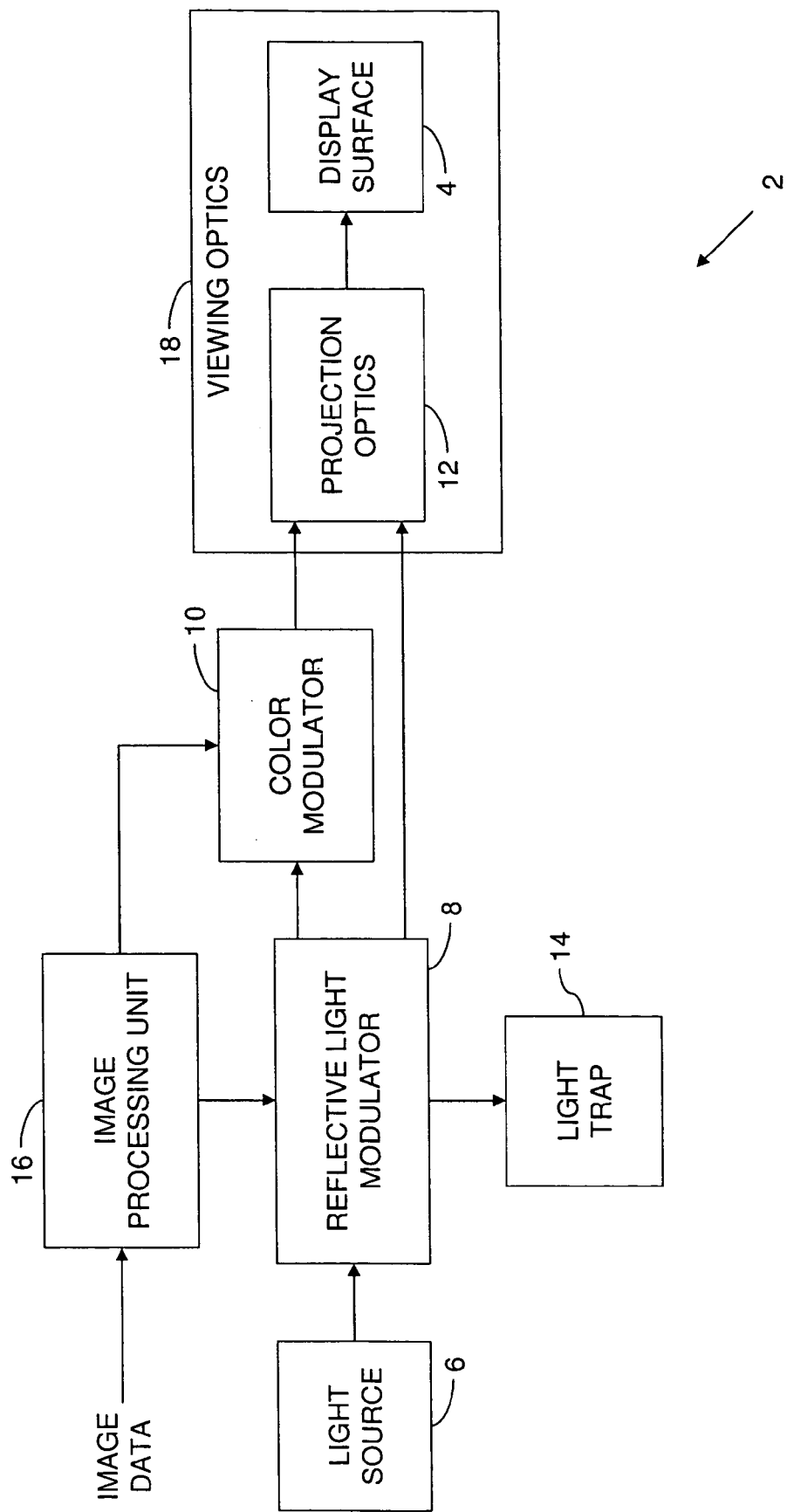
FIG. 1 is a block diagram illustrating one embodiment of the present invention projection system.

FIG. 1 illustrates one embodiment of projection system 2 for projection of pixelized color images onto display surface 4. Projection system 2 includes light source 6, reflective light modulator or reflective based modulator array 8, color modulator or color modulator array 10, light trap 14, image processing unit 16, and viewing optics 18. In one embodiment, viewing optics 18 include projection optics 12 and display surface 4. FIG. 1 does not illustrate various optical components such as integrating rods, homogenizers, and relay optics that are particular to the specific projector system implementation with which the invention is used.

In describing this invention, various terms are used to generally reflect complex concepts. For example, the term "color" when applied to a beam of light or pixel, or spot, of light refers to the particular spectral distribution of the beam or the pixel, which can have more than one meaning consistent with this disclosure. For example, the color red may refer to a highly monochromatic red beam of light or it may refer to a light having a spectral distribution having a spectral peak near red.

Light source 6 is any source of light suitable for use in projection system 2. One example of such a suitable light source 6 is an ultra high pressure mercury lamp. Additionally, one of the advantages of the present invention is a lower etendue requirement from light source 6. Consequently, xenon and plasma bulbs are also examples of suitable light sources 6.

Color modulator array 10 is any apparatus or system configured to modulate the wavelength of light and reflect modulated light toward display surface 4. In one embodiment, color modulator 10 is configured to generate an intensity versus wavelength distribution that is peaked about a single wavelength. In another embodiment, color modulator 10 is configured to alter the spectral distribution of incoming light by absorbing most of the incoming light.

In one embodiment, color modulator 10 is an interference based or interferometric modulator that modulates the spectral distribution of impinging light to generate an output color in response to an applied voltage signal. In this way, interferometric modulator 10 selects a color or spectral distribution that is transmitted to display surface 4. In the case of an interferometric modulator, color modulator 10 is also known as a Fabry Perot based light processing device.

In one embodiment, color modulator array 10 is a device including an array of cells or color pixel elements. Each color pixel element has the capability of receiving white light and outputting light having a color spectral distribution that is peaked about a particular wavelength, such as red, green, blue, cyan, yellow, magenta, violet, or other colors depending upon the design of color modulator 10.

In one embodiment, each cell includes an optical cavity whose dimension normal to the array of cells is responsive to the application of a voltage across opposing plates that help to define the cavity. This can be done by controlling the voltage across the opposing plates or controlling charge injection to one or both of the opposing plates.

White light impinges on each of the cells. As a result of optical interference, each cell reflects light having an intensity versus wavelength distribution that is peaked about a particular wavelength. Thus, the output of each cell is a voltage or charge selected peak wavelength. The light is then reflected from the cell to the viewing optics 18 and/or display surface 4.

In an exemplary embodiment, each cell also has a black position (as a result of an input voltage or charge) wherein either very little or no light is reflected from the cell. This can be referred to as the black condition for the light modulator element.

Reflective light modulator 8 is any apparatus suitable for selectively reflecting light in projection system 2. Reflective light modulator 8 is disposed to receive light from light source 6 and selectively reflect the light toward color modulator 10 and display surface 4. Reflective light modulator 8 may have either the same resolution or a different resolution than color modulator 10. One example of a suitable reflective light modulator 8 is a digital micro-mirror device, also known as a digital mirror device, DMD, or a digital light processor DLP chip.

In one embodiment, reflective light modulator 8 includes an array of reflective surfaces 20 (FIGS. 2–4) or mirror elements 20. Each mirror element 20 is configured to define at least two possible paths for light through projection system 2. In a first optical path, light passes from mirror element 20 to viewing optics 18 while bypassing color modulator 10. In a second optical path, the light is modulated by color modulator 10 before passing to viewing optics 18.

For ease of discussion, in this disclosure light is referred to as being "passed" from one component to another. Discussion of intervening optics such as relay optics, homogenizing or integrating optics, and polarizing optics, is omitted, as the details of these intervening optics are known in the art.

Projection optics 12 receive modulated light from modulators 8 and 10 and image that light onto display surface 4. In a presentation-style front projection system embodiment, projection optics 10 include "long throw" optics and display surface 4 include a projection screen or other surface that is physically separate from projection system 2. In an alternative embodiment for a rear projection television (RPTV), projection optics 10 include "short throw" optics and display surface 4 includes a screen that is integral to projection system 2.

Light trap 14 is any apparatus or system configured to receive light reflected from reflective light modulator 8 and prevent it from being seen on display surface 4 or otherwise impacting proper operation of/or image formation by projection system 2. In an embodiment of the present invention with light trap 14, reflective light modulator 8 is further configured to selectively reflect light toward light trap 14.

Image processing unit 16 is any combination of hardware and executable code configured to receive video, image signals, or both, and generate proper control signals for modulators 8 and 10 in order to properly modulate the light beam from light source 6. Image processing unit 16 may include devices such as a coordinate conversion device for converting the incoming information to coordinates such as red, green, and blue (R, G, B) coordinates and devices to buffer the control information before it is passed to modulators 8 and 10.

Figure 2:
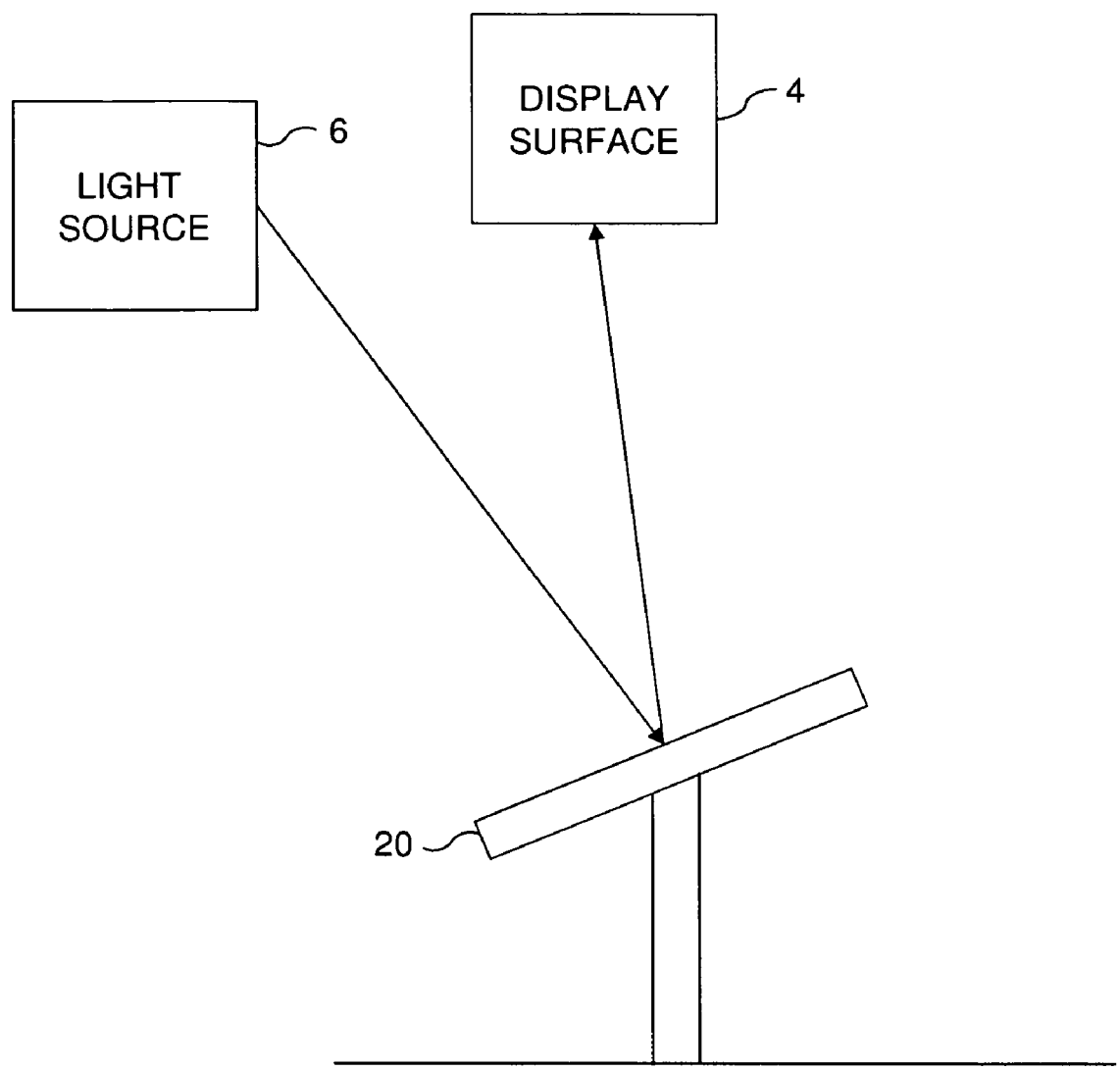
FIGS. 2–4 illustrate the operation of the reflective light modulator shown in FIG. 1.
Figure 3:
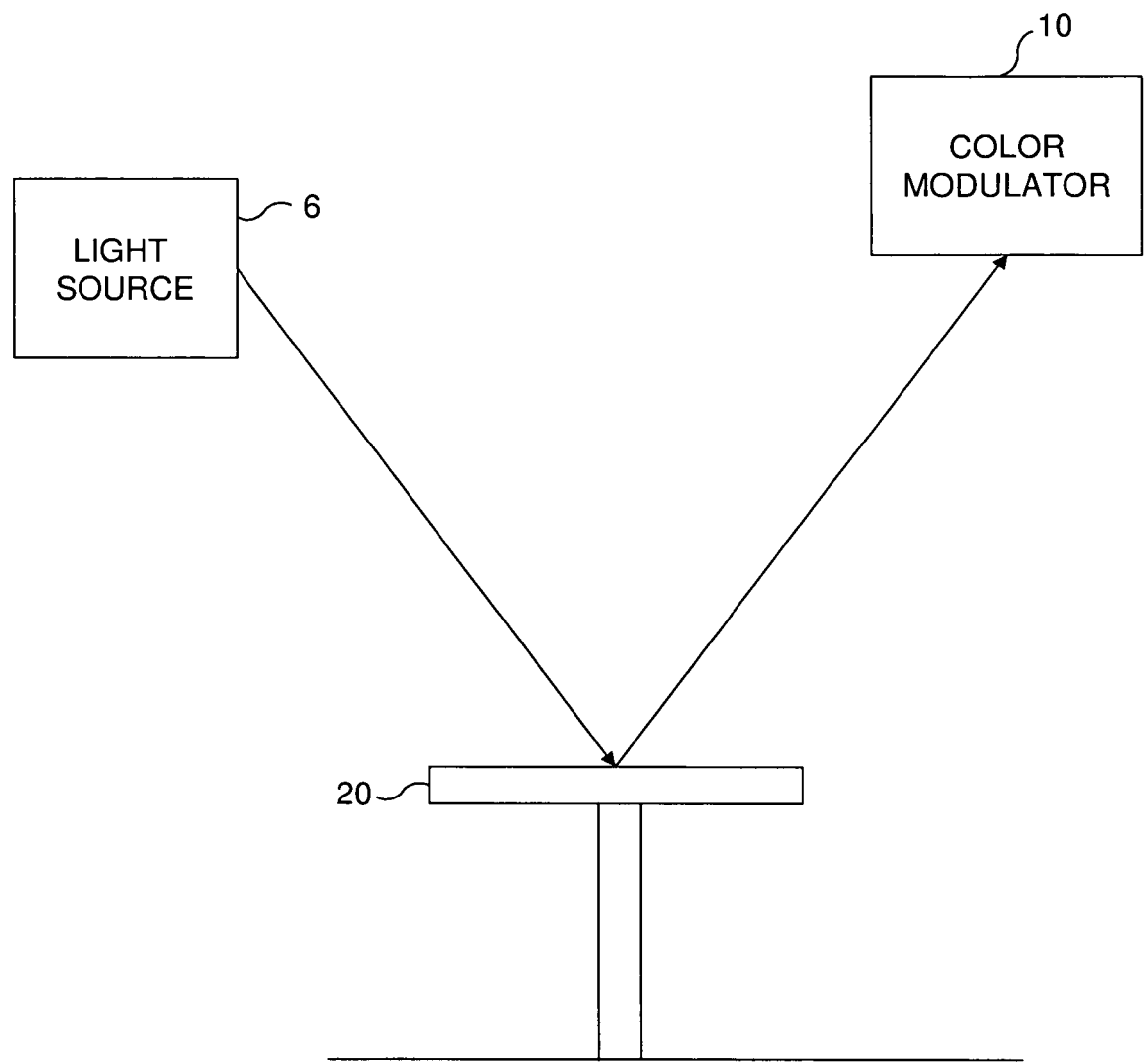
Figure 4:
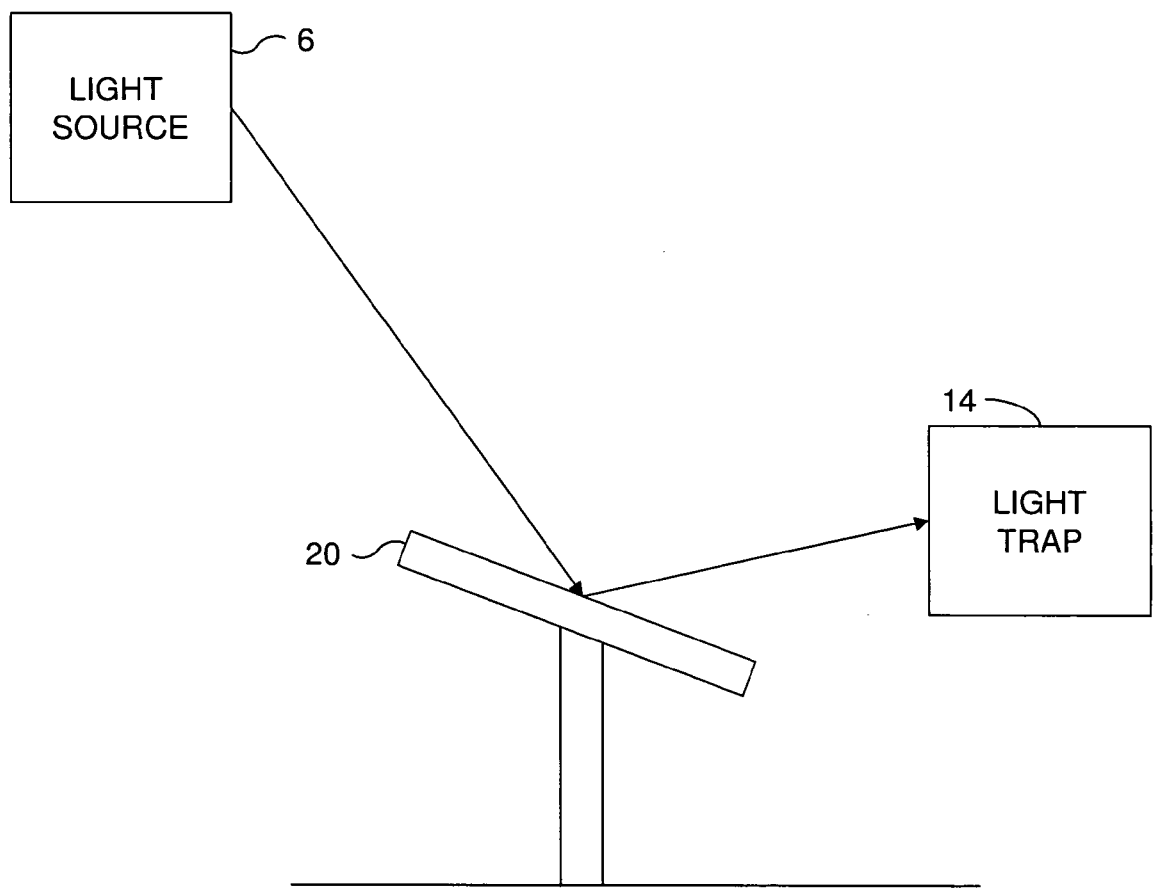

FIGS. 2–4 illustrate one exemplary embodiment of the operation of a single mirror element 20 or reflective pixel element 20. Other embodiments are also possible which are not illustrated, but are foreseeable by those skilled in the art. It is anticipated that reflective light modulator 8 would include an array of such mirror elements 20. The position and relative size and shape of items shown in FIGS. 2-4 is simplified to more clearly illustrate the present invention. For example, mirror elements 20 may include structures such as a separate yoke and hinge structure with an overlying reflective structure that results in a double layered mirror appearance. Discussion of this structural complexity is avoided because it does not illustrate the invention.

In one embodiment, mirror element 20 includes an underlying substrate and associated addressing electronics. In an exemplary embodiment, the addressing electronics allows mirror element 20 to take on three positions—(1) a neutral, reset, or unlatched position wherein the surface of mirror element 20 is substantially parallel to a substrate surface that underlies the mirror element; (2) a first latched or deflected position wherein mirror element 20 is electrostatically and angularly deflected to a first side; or (3) a second latched or deflected position wherein the mirror element is angularly deflected to a second side that is opposite the first side. In alternative embodiments, the addressing electronics allow mirror element 20 to take on two positions or any number of desired positions.

Depicted in FIG. 2 is a single mirror element 20 in a first deflected position such that mirror element 20 passes light from light source 6 toward the viewing optics 18 without intervening color modulation. Avoiding color modulating reduces the absorptive loss of this light and generates less heat within color modulator 10. Generating less heat within color modulator 10 reduces the cooling requirement for color modulator 10.

Reducing the absorptive loss of the light allows more light to be passed to viewing optics 18. As a result of mirror element 20 being in the first deflected position, a bright white pixel element appears on the display surface 4.

Furthermore, since this light avoids color light modulation, color modulator 10 has less light to modulate. Providing less light for color modulator 10 to modulate consequently allows the number of bits of data processed by color modulator 10 to be reduced. Reducing the number of bits of data allows color modulator 10 to have a lower data rate requirement.

Depicted in FIG. 3 is the single mirror element 20 in the neutral position wherein mirror element 20 is substantially parallel to the underlying substrate. In this position, the light from the mirror element 20 is passed to one or more pixel elements of color modulator array 10.

Depicted in FIG. 4 is a single mirror element 20 in the second deflected position. In this position, light from mirror element 20 is passed to light trap 14. In an alternative embodiment for projector system 2, the second deflected position is utilized to pass light from light source 6 toward one or more pixel elements of color modulator array 10. In this alternative embodiment, the neutral position for the mirror array may be used to pass light to light trap 14.

Referring again to FIGS. 1–4, a light beam from light source 6 is divided into smaller beams of light by the reflective light modulator 8. Each of the smaller beams of light takes one of two optical paths before defining a pixel on display surface 4. In the case of a first optical path, the smaller beam passes from reflective light modulator 8 to display surface 4 without being color modulated by color modulator 10, thus producing a pixel on display surface 4 having a spectral distribution or color that is substantially the same as light source 6. In the case of a second optical path, the smaller beam passes from reflective light modulator 8 to color modulator 10 and then to display surface 4, forming a pixel on display surface 4 having a color or spectral distribution pursuant to a control signal sent to color modulator 10.

The selection of the path taken by each smaller beam depends on the desired pixel color on display surface 4. If a pixel is desired to be white or substantially the color of light source 6, a light beam travels to reflective light modulator 8 where it is deflected along the first optical path to display surface 4, without color modulation from color modulator 10. The resultant color of the pixel is not modulated and hence and a substantially white pixel is displayed on display surface 4.

If a pixel is desired to have a color different than light source 6, light travels to reflective light modulator 8 where it is deflected to color modulator 10. Color modulator 10 modulates the color or spectral distribution of the light and deflects the light to display surface 4.

If a pixel is desired to be black, a light beam travels to reflective light modulator 8 where it is deflected to light trap 14. This prevents the light from reaching display surface 4, resulting in a black pixel. Black pixels can also be generated by deflecting them to color modulator 10 if the color modulator 10 has a black state.

Figure 5:
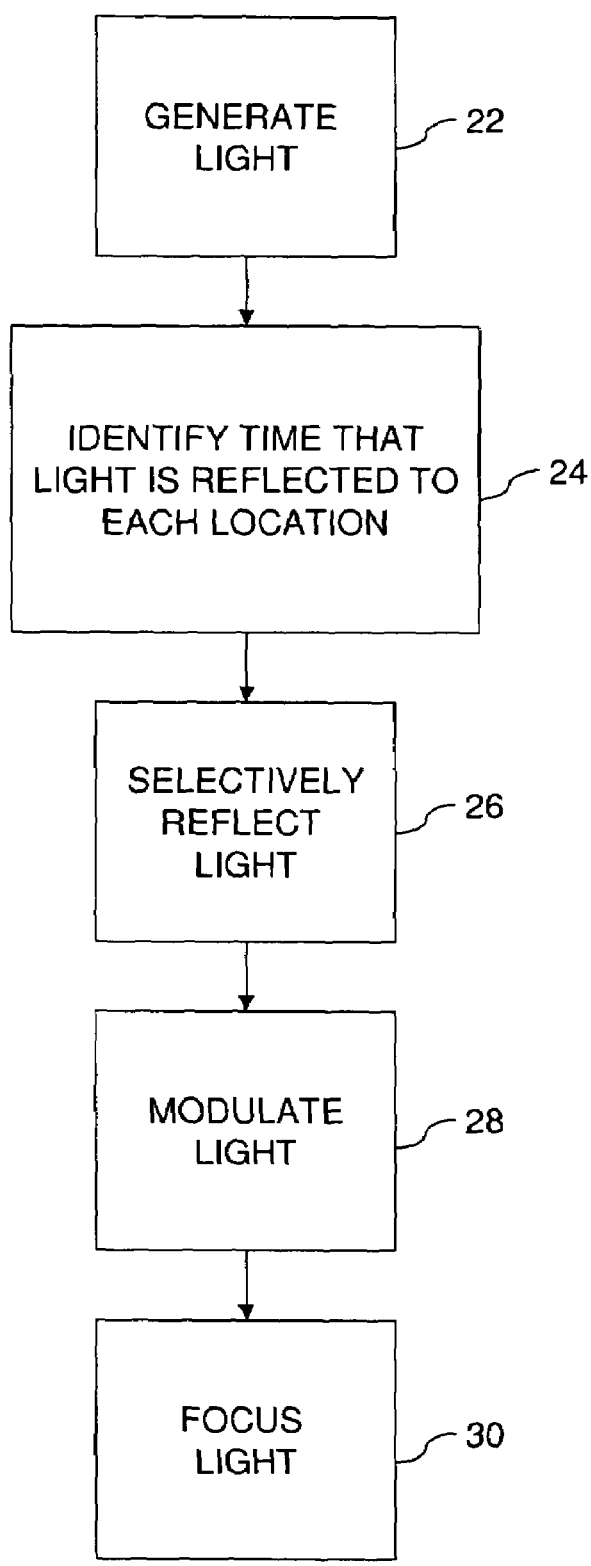
FIG. 5 is a flow chart illustrating one embodiment of the present invention method for projecting pixelized color images onto a display surface.

FIG. 5 is a flow chart representing steps of one embodiment of the present invention. Although the steps represented in FIG. 5 are presented in a specific order, the present invention encompasses variations in the order of steps. Furthermore, additional steps may be executed between the steps illustrated in FIG. 5 without departing from the scope of the present invention.

Light is generated 22. In one embodiment, light is generated 22 by light source 6. In an alternate embodiment, light is generated 22 elsewhere and piped into projection system 2.

In one embodiment, a time is identified, for each pixel of the pixelized color image, that reflective light modulator 8 is positioned to reflect the light toward interferometric modulator 10 and toward display surface 4.

In one embodiment, the generated light is selectively reflected, or passed, 26 toward either interferometric modulator 10 or display surface 4. In an alternate embodiment, the generated light is selectively reflected 26 toward either interferometric modulator 10, display surface 4, or light trap 14. Interferometric modulator 10 modulates 28 the wavelength of light and reflects the modulated light toward display surface 4. In one embodiment, the reflected light towards display surface 4 is focused 30 by projection optics 12 before passing to display surface 4.

Referring again to FIG. 1, information is received at image processing unit 16 that defines an image, series of images, or a video sequence. Image processing unit 16 processes that information and then properly controls various components including modulators 8 and 10 in order to generate the image, series of images, or video sequence on display surface 4.

The incoming signal may be one of a number of possible standards, including S-Video, a PAL signal (the European video standard), or an NTSC signal, the television standard in the United States for some time. There are a number of ways of implementing the control electronics for projection system 2, but what follows is one example.

To simplify this discussion, light source 6 is treated as a sufficiently balanced white light source. If it is not, corrections can be made using color light modulator 10 by assigning a portion of the frame period for color correction.

Image processing unit 6 includes a coordinate conversion device that converts information received into information that can be used by frame buffers of image processing unit 16. For example, the incoming information may be converted into red, green, and blue (RGB) values on a frame-by-frame basis. For each video frame, there is an array of RGB values for each pixel to be displayed on display surface 4.

For each pixel location, the components of R, G, and B can be expressed as Nr, Ng, and Nb, respectively, wherein Nr is the red component to be displayed, Ng is the green component, and Nb is the blue component. Stated further, Nr, Ng, and Nb are normalized values that are proportional to the red, green, and blue component intensities for the pixel location during a particular frame period.

In order to provide control signals for modulators 8 and 10, it is desireable to separate out a pure white signal that defines the first optical path that bypasses the color modulator as discussed above. This can be calculated as follows:

Nw="White Component"=Minimum value for Nr, Ng, and Nb. This value defines the time period for that pixel on frame period for which the first optical path is employed. Stated another way, this defines a fraction of the frame for which white light is directed to the pixel location.

During the remainder of the frame period, the non-white portion of the light can be generated using a second optical path. This contribution is computed from the coefficients with the white component subtracted out.

Nr-Nw, Ng-Nw, and Nb-Nw=R, G, and B components, respectively, to be generated using color modulator 10. These components are hereafter referred to as the "residual" of the color components.

Most actual white light sources are not perfectly balanced. For example, ultra high pressure mercury (UHP Hg) light sources tend to be somewhat deficient in red. References to a "substantially white" light source include light sources that are either spectrally balanced or have some deficiencies such as the UHP Hg light sources. Image processing unit 16 can include a correction factor "lookup table" to correct for an imperfectly balanced broad spectrum or substantially white light source. Alternatively, additional light sources such as red LEDs can be used to supplement the deficiencies of the light source.

Figure 6:
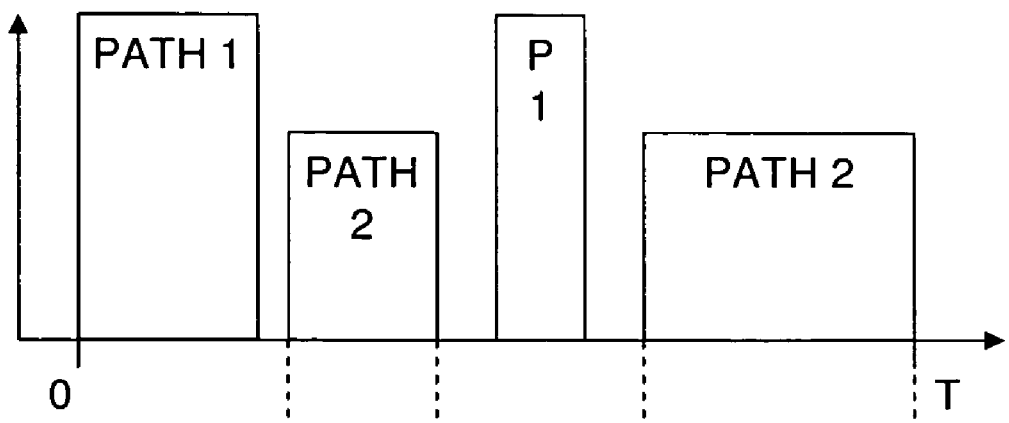
FIG. 6 is an exemplary operational timing diagram for generating a color according to one embodiment of the present invention.
Figure 6:
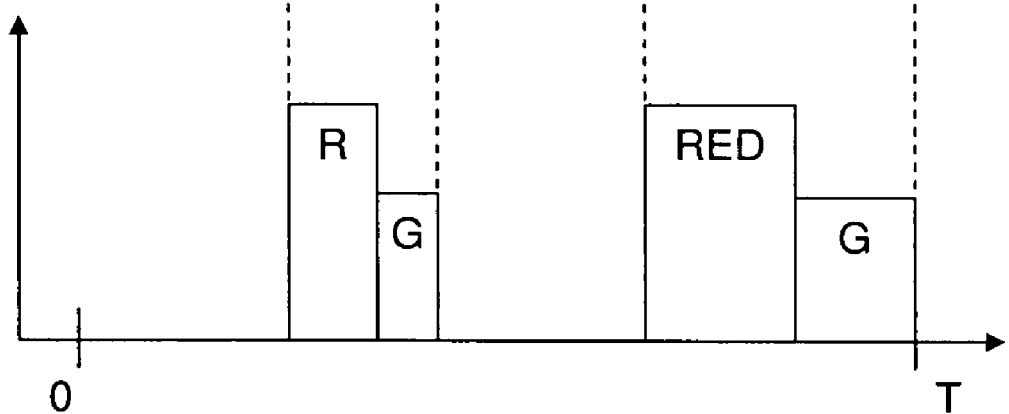

Illustrated in FIG. 6 is an exemplary operational timing diagram for generating a color signal during a frame period T for a single pixel on image display surface 4. Modulators 8,10 are operated in cooperative manner for proper generation of pixels.

As discussed above, the white component Nw is computed by the image-processing unit 16 as discussed above. This defines the "path 1" or "P1" time slots, which refers to the portion of the time period for which the first optical path is used, as indicated in FIG. 6. For maximum white intensity, such as a very bright star in a night sky, P1 may extend over nearly the entire frame period T. Note that to reduce visual artifacts and flicker, the time period for path 1 can be broken into multiple time slots across the frame period T as illustrated.

Next, the remaining color coordinates are computed. These are generated using the second optical path indicated by "path 2" in FIG. 6. Again, the signal is spread across the frame period to minimize flicker and/or visual artifacts. The remaining signal for this exemplary timing diagram, after subtracting white, is a combination of red and green is indicated in FIG. 6.

The foregoing description is only illustrative of the invention. Various alternatives and modifications can be devised by those skilled in the art without departing from the invention. Accordingly, the present invention embraces all such alternatives, modifications, and variances that fall within the scope of the appended claims.

What is claimed is:

1. A projection system for projection of pixelized color images onto a display surface, the projection system comprising:
   a light source;
   a color modulator configured to modulate the spectral distribution of light and pass modulated light to the display surface; and
   a reflective light modulator disposed to receive light from the light source and selectively reflect the light into a first optical path that includes the color modulator and a second optical path that bypasses the color modulator.

2. The projection system of claim 1 wherein the reflective light modulator includes a digital micro-mirror device.

3. The projection system of claim 1, wherein the reflective light modulator includes an array of mirror elements, each mirror element having a first deflected position wherein light is passed from the mirror element to the display surface to form a substantially white pixel on the display surface.

4. The projection system of claim 3, wherein each mirror element has a second deflected position wherein light is reflected from the mirror element to the color modulator.

5. The projection system of claim 3, wherein each mirror element has a neutral position wherein light is reflected from the mirror element to the color modulator.

6. The projection system of claim 1, wherein the color modulator is an interferometric based modulator.

7. The projection system of claim 1, wherein the color modulator includes an array of color pixel elements.

8. The projection system of claim 1, wherein the projection system defines two light paths between the reflective light modulator and the display surface including first and second light paths and wherein the first light path transmits light from the reflective light modulator to the display surface bypassing the color modulator.

9. The projection system of claim 1 further including a light trap and wherein the reflective light modulator is further configured to selectively reflect light toward the light trap.

10. A projection system for projection of pixelized color images onto a display surface, the projection system comprising:
    a light source;
    means for modulating the spectral distribution of light and pass modulated light toward the display surface;
    reflective means for receiving light from the light source and selectively directing the light between the means for modulating the spectral distribution and the display surface; and
    a light trap and wherein the reflective means further includes means for selectively reflecting light toward the light trap.

11. The projection system of claim 10 wherein the reflective means includes a reflective light modulator.

12. The projection system of claim 11 wherein the reflective light modulator includes a digital micro-mirror device.

13. The projection system of claim 10 further including optic means for intercepting light reflected towards the display surface from the means for modulating and the reflective means.

14. A method for projecting pixelized color images onto a display surface, the method comprising:
    generating light,
    selectively passing the generated light between an interferometric modulator and the display surface,
    the interferometric modulator modulating the wavelength of light and passing the modulated light toward the display surface.

15. The method of claim 14 further including focusing the light passed towards the display surface.

16. The method of claim 15 further including identifying, for each pixel of the pixelized color image, a time the reflective light modulator is positioned to pass the light toward the interferometric modulator and toward the display surface.

17. A projection system for generating color images on a display surface, the projection system comprising:
    a color modulator including an array of color pixel elements;
    a light source;
    viewing optics; and
    a reflective light modulator disposed to receive light from the light source, the reflective light modulator having an array of mirror elements wherein each mirror element defines at least two light paths including a first light path wherein reflected light passes from the mirror element to the viewing optics, bypassing the color modulator and a second light path wherein reflected light passes from the light source to the color modulator before reaching the viewing optics.

18. The projection system of claim 17 wherein the color modulator is an interferometric modulator configured to alter the spectral distribution of light at each of the color pixel elements.

19. The projection system of claim 18 wherein the color modulator is configured to generate an intensity versus wavelength distribution that is peaked about a single wavelength.

20. The projection system of claim 18 wherein the color modulator is configured to alter the spectral distribution of incoming light by absorbing most of the incoming light.

21. The projection system of claim 17 further comprising an image processing unit, the image processing configured to determine a substantially white component of light and utilize the first light path to generate the substantially white component of light.

22. A method of generating an image during a frame period, the method comprising:
    providing a projection system comprising a reflective light modulator having an array of mirror elements each receiving substantially white light from a light source, a color modulator having a plurality of color pixel elements, and a display surface;
    selectively controlling the reflective light modulator to define a first path wherein mirror elements pass the substantially white light to the display surface without color modulation by the color modulator and to define a second path wherein mirror elements reflect the substantially white light to the color modulator that modulates the color of the light before reflecting the light of the second path to the display surface.

23. The method of claim 22 further comprising:
    receiving image information defining color values for locations on the display surface;
    determining a substantially white component of each color value;
    utilizing the first path to define the substantially white component; and
    if residuals of the color values remain, utilizing the second path to generate the residual of each color value.

24. The method of claim 22 wherein defining the first path includes angularly deflecting mirror elements to a first position and defining a second path includes angularly deflecting mirror elements to a second position.

25. The method of claim 22 wherein defining the first path includes angularly deflecting mirror elements to a first position and defining a second path includes releasing the mirror elements into a neutral position.

26. The method of claim 22 further comprising selectively controlling the reflective light modulator to define a third path wherein mirror elements pass the substantially white light to a light trap.

* * * * *